(12) United States Patent
Hebrard

(10) Patent No.: US 9,482,284 B2
(45) Date of Patent: Nov. 1, 2016

(54) BEARING

(71) Applicant: Aktiebolaget SKF, Göteborg (SE)

(72) Inventor: Yoann Hebrard, Sarras (FR)

(73) Assignee: AKTIEBOLAGET SKF, Gothenburg (SE)

( * ) Notice: Subject to any disclaimer, the term of this patent is extended or adjusted under 35 U.S.C. 154(b) by 453 days.

(21) Appl. No.: 14/066,552

(22) Filed: Oct. 29, 2013

(65) Prior Publication Data

US 2014/0333164 A1 Nov. 13, 2014

(30) Foreign Application Priority Data

Oct. 29, 2012 (FR) ..................................... 12 60305

(51) Int. Cl.
| | | |
|---|---|---|
| H01L 41/08 | (2006.01) | |
| F16C 41/00 | (2006.01) | |
| H02K 7/08 | (2006.01) | |
| H02K 19/26 | (2006.01) | |
| H02K 7/18 | (2006.01) | |
| F16C 19/52 | (2006.01) | |

(52) U.S. Cl.
CPC ............ F16C 41/004 (2013.01); F16C 19/52 (2013.01); H02K 7/08 (2013.01); H02K 7/1846 (2013.01); H02K 19/26 (2013.01)

(58) Field of Classification Search
USPC ....... 310/325, 336, 334, 339, 311; 73/866.1, 73/861.18, 861.28, 672, 593
See application file for complete search history.

(56) References Cited

U.S. PATENT DOCUMENTS

| | | | | |
|---|---|---|---|---|
| 5,514,924 | A * | 5/1996 | McMullen | .......... F16C 32/0485 310/90.5 |
| 6,535,135 | B1 * | 3/2003 | French | ..................... B61K 9/04 340/682 |
| 6,595,693 | B1 * | 7/2003 | Message | ............... F16C 41/007 324/174 |
| 6,892,587 | B2 | 5/2005 | Mizutani | |
| 2002/0139191 | A1 * | 10/2002 | Hedeen | ............... G01M 13/045 73/593 |
| 2011/0016980 | A1 | 1/2011 | Plavan | |

FOREIGN PATENT DOCUMENTS

EP  0172104 A1  2/1986

* cited by examiner

*Primary Examiner* — Thomas Dougherty
*Assistant Examiner* — Karen B Addison
(74) *Attorney, Agent, or Firm* — Bryan Peckjian; SKF USA Inc. Patent Dept.

(57) ABSTRACT

A bearing includes at least an inner ring, an outer ring, and rolling bodies arranged between the inner and outer rings, one of the rings being designed to turn and the fixed, and one of the rings including an inducing element is designed to generate an inducing electromagnetic field, the other of the rings including an electrical circuit in which an induced current is generated when one of the rings turns in relation to the other of the rings, and when the inducing element generates an inducing electromagnetic field, wherein the inducing element designed to generate an inducing electromagnetic field includes a module having a piezoelectric effect and/or a module having a thermoelectric effect.

13 Claims, 3 Drawing Sheets

BEARING

CROSS-REFERENCE

This application claims priority to French Patent Application No. FR1260305 filed on Oct. 29, 2012, the content of which is fully incorporated herein by reference.

FIELD OF THE INVENTION

The present invention relates to a bearing including an inner ring and an outer ring, and rolling bodies arranged between the rings, one of the rings being designed to turn and the other not, and one of the rings including an inducing element designed to generate an inducing electromagnetic field, the other of the rings including an electric circuit in which an induced current is generated when one of the rings turns in relation to the other of the rings, and when the inducing element generates an inducing electromagnetic field.

BACKGROUND OF THE INVENTION

In such bearings, used for example in diverse equipment, notably in gearboxes, for example, helicopter gearboxes such as that described in document EP0172104, the rotation of the ring carrying the inducing element causes an induced current to be generated in the other ring.

Document U.S. Pat. No. 6,892,587 is known, for example, which describes an inducing element incorporating permanent magnets.

However, it has been noted that the magnets, providing permanent magnetization, trap the metal particles circulating in the bearing and exterior to it, which can be a cause of failure, notably due to seizing.

The present invention aims notably to reduce these drawbacks.

SUMMARY OF THE INVENTION

To that effect, following a first aspect, the invention proposes a bearing of the aforementioned type, characterized in that the inducing element designed to generate an inducing electromagnetic field includes a module having a piezoelectric effect and/or a module having a thermoelectric effect.

Such a bearing, including a thermoelectric or piezoelectric module, transforms variations of the ambient conditions (vibrations and/or temperature) of the bearing into electrical energy.

Such a bearing is designed to generate, in an autonomous and integrated manner, an induced current, for example for the purpose of its electric power supply, without giving rise to permanent magnetization that traps the metal particles. In fact, there is no magnetization when the bearing is idle.

Such a bearing therefore enables an extension of the service life of the bearing.

In embodiments of the invention, the bearing according to the invention furthermore incorporates one or more of the following characteristics:

- it includes a processing module that requires an electric power supply in order to function, in which the current induced in the electric circuit is used to supply the processing module;
- at least one part, requiring an electric power supply in order to function, of the processing module, is integral with the ring including the electric circuit;
- it includes a capacitor arranged in parallel with the module having the piezoelectric effect and/or a module having a thermoelectric effect;
- it includes an inductive resistor on an electric link arranged in parallel with the module having the piezoelectric effect and/or the module having a thermoelectric effect, a switch designed to open or close the electric link and a control device of the switch designed to control the opening or closing of the switch according to the voltage value at the terminals of the module having the piezoelectric effect and/or of the module having the thermoelectric effect;
- it furthermore includes a voltage rectifier arranged on the electric link;
- the ring includes the inducing element includes terminals arranged on its surface, configured to project towards the other of the rings, and the inducing element includes first windings wound around the terminals and electrically connected to the module having the piezoelectric effect and/or the module having the thermoelectric effect;
- a connection of the module having the piezoelectric effect and/or of the module having the thermoelectric effect is connected to one extremity of each of the first windings via respective capacitors;
- the other extremity of each of the first windings is connected to one extremity of the first winding arranged on a neighboring terminal via an inductive resistor or is connected to another connection of the module having the piezoelectric effect and/or the module having the thermoelectric effect;
- the ring includes the electric circuit includes terminals arranged on its surface, configured to project towards the other of the rings, and the electric circuit includes second windings wound around the terminals;
- the extremities of each second winding are connected to a common terminal;
- one of the extremities of each second winding is connected to the common terminal via a resistor;
- the other of the extremities of each second winding is connected to the common terminal via an inductive resistor.

BRIEF DESCRIPTION OF THE FIGURES

These characteristics and advantages of the invention will emerge from reading the description that will follow, given only as an example, and made with reference to the appended drawings, on which.

DETAILED DESCRIPTION OF THE INVENTION

Figure 1:
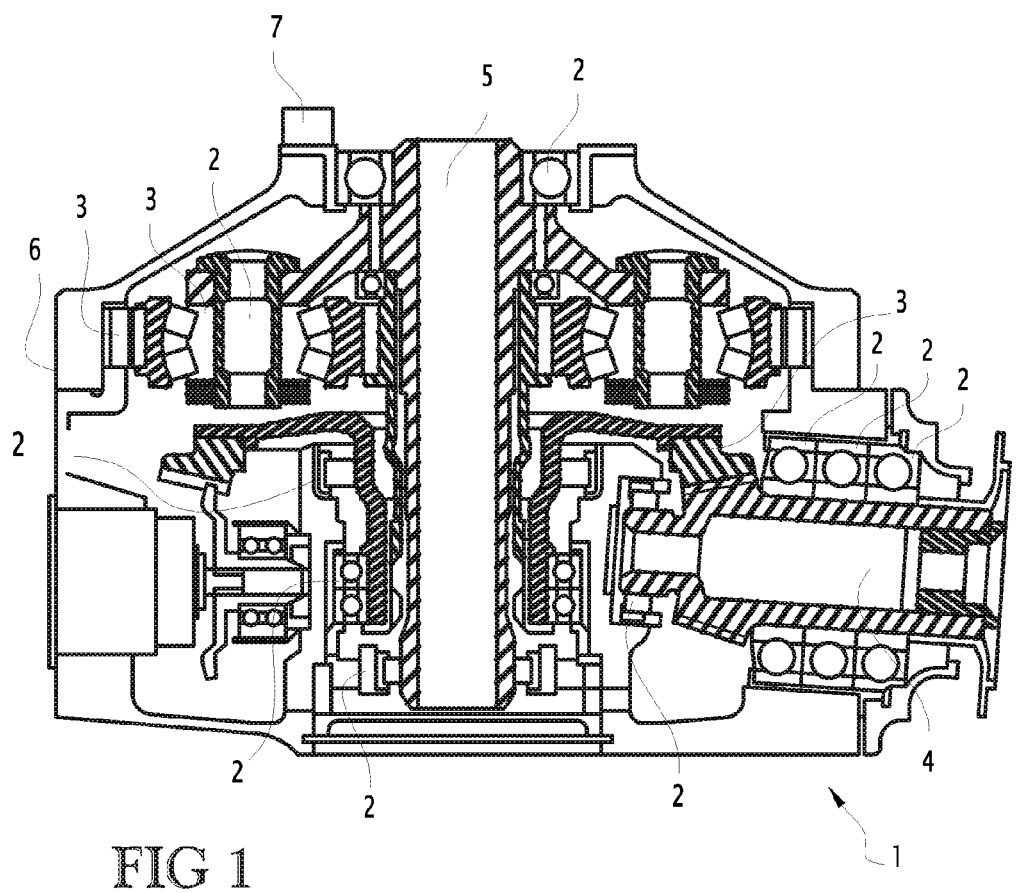
FIG. 1 represents a cutaway view of a helicopter gearbox.

In FIG. 1, a cutaway view of a helicopter gearbox 1 is represented. This gearbox 1 is designed to perform the transmission of the rotating motion between a primary shaft 4, which is the engine shaft and a secondary shaft 5, which is the helicopter rotor, according to several transmission ratios. It includes an outer housing 6, which incorporates, in addition to the primary and secondary shafts, several bearings 2 and several gears 3.

In an embodiment of the invention, each of these bearings 2 is similar to the mechanical bearing 10 described below with reference to FIGS. 2 and 3.

Figure 2:
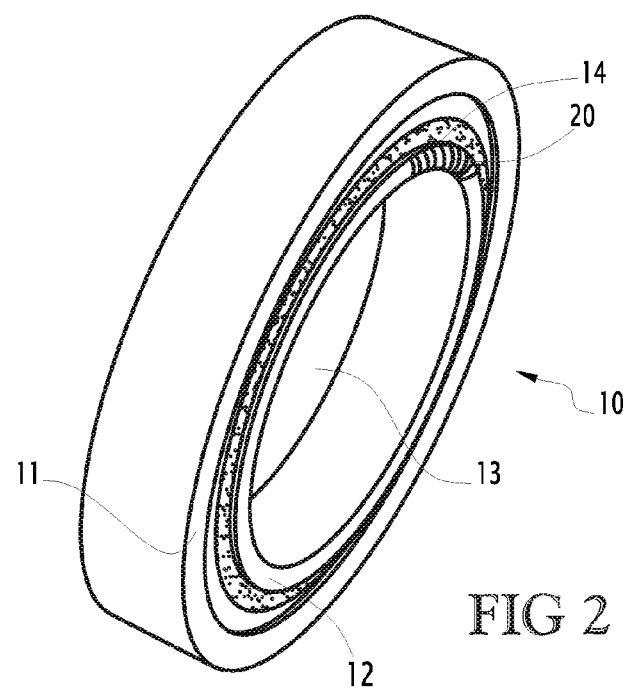
FIG. 2 is a view of a bearing in an embodiment of the invention.
Figure 3:
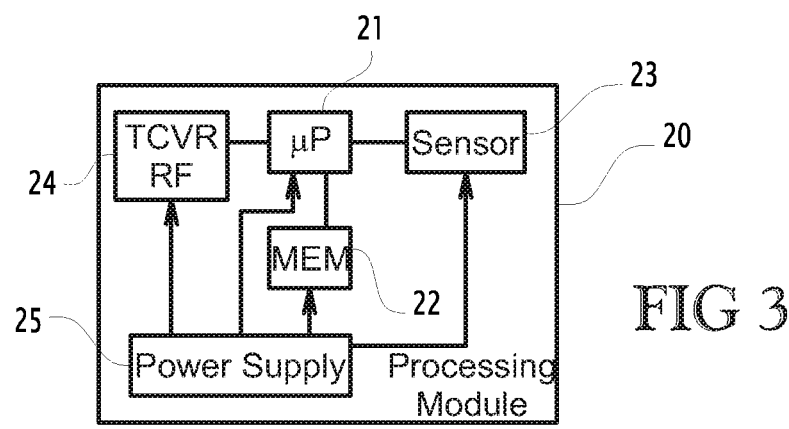
FIG. 3 is a view of a block diagram of a processing module of a bearing in an embodiment of the invention.

With reference to FIG. 2, a mechanical bearing 10 in an embodiment of the invention incorporates two coaxial rings: an outer ring 11 and an inner ring 12.

In the space 14 between these coaxial rings 11 and 12, balls are placed in a lubricant and held apart by a cage (not illustrated).

In a known manner, a bearing 10 optimizes the friction between two parts and provides a support for one of these two parts, which is rotating.

One of these parts (not illustrated) is fastened to the outer ring 11. It is, for example, a rotating shaft enclosing the outer ring 11. In the case of the gearbox 1, this shaft is, for example, the primary shaft 4.

The other part (not illustrated), for example, a part of the outer housing of the gearbox 1, is arranged with a tight fit in the receptacle described by the inner ring 12. It is fixed in relation to the rotating shaft integral with the outer ring 11.

It will be noted that in other bearings 10 according to the invention, this time, it is the inner ring that is fixed with a tight fit to a rotating part, while the outer ring is integral with a fixed part.

According to the invention, a processing module 20 is fastened to one of the rings. For example, the processing module 20 is integrated to a housing fixed to a ring of the bearing by screwing or flanging. In another example, a shape is made in a ring of the bearing, this shape acting as a support for the processing module 20.

As illustrated in FIG. 2, in the case under consideration, the processing module 20 is fastened to the outer surface of the inner ring 12.

The processing module 20 incorporates for example, in the case under consideration, a microprocessor 21, a memory 22, a sensor 23 designed to measure one or more parameter(s), a radio frequency transmitter 24 and an electric power supply module 25.

The electric power supply module 25 is designed to generate an electrical energy induced by the variation of an inducing magnetic flux during the relative rotation of the rings 11, 12 and to deliver this electrical energy to the components of the processing module 20, whose functioning requires an electric power supply. Thus, in the case under consideration, it supplies electrical energy notably to the microprocessor 21, to the radio frequency transmitter/receiver 24 and possibly to the sensor 23.

Figure 5:
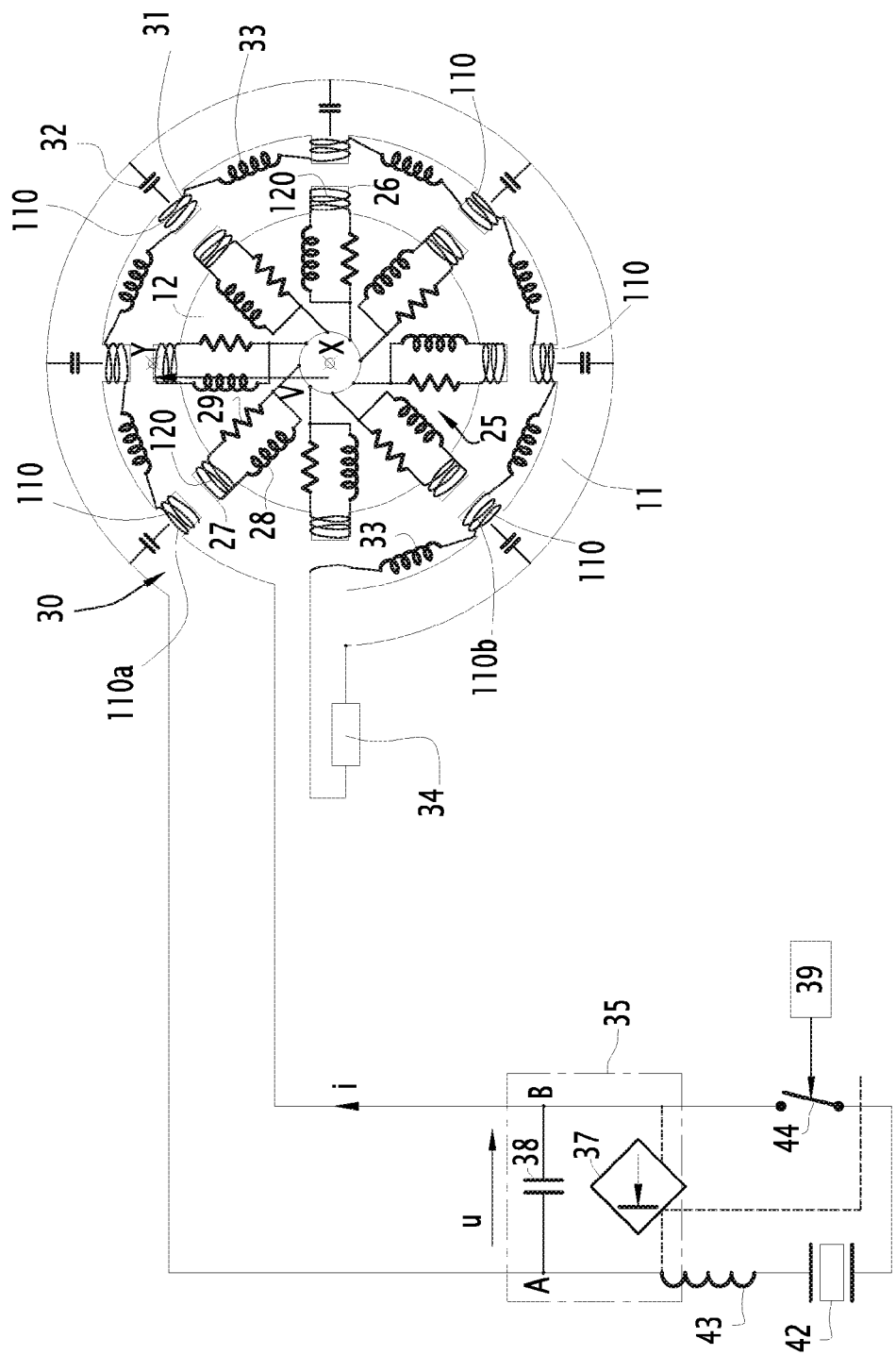
FIG. 5 illustrates the electric circuits arranged on the rings of the bearing.

With reference to FIG. 5, the inner ring 12 includes terminals 120 spaced over its outer surface, cylindrical in shape and projecting towards the outer ring 11. The number of terminals 120 illustrated is eight, but it can have any value.

The electric power supply module 25 incorporates an electric circuit associated with each terminal 120, including in the case under consideration, a winding 27, an inductive resistor 28 and a resistor 29.

The winding 27 is wound around each of these terminals 120. One of the extremities of the winding 27 is connected to an extremity of the inductive resistor 28. The other extremity of the winding 27 is connected to an extremity of the resistor 29. The other extremity of the inductive resistor 28 and the other extremity of the resistor 29 are connected to a point X connecting all of the corresponding extremities of the different terminals 120 in a star.

The induced voltage V is collected between this common point X and a point V of the winding situated at the outer extremity of a terminal 120.

As also illustrated in FIG. 5, the outer ring 11, designed to be driven in rotation by the shaft with which it is integral, incorporates an inducing block 30.

The outer ring 11 includes terminals 110 spaced over its inner surface, cylindrical in shape and projecting towards the inner ring 12. The number of terminals 110 illustrated is seven, but it can have any value.

Advantageously, these terminals 110 are arranged in such a way as to be facing the terminals 120 of the inner ring 12 during the relative rotation of the rings 11, 12.

In the embodiment under consideration, the inducing module 30 includes an electric circuit associated with each terminal 110, including, in the case under consideration, a winding 31, a capacitor 32 and an inductive resistor 33.

The winding 31 is wound around each of these terminals 110. One of the extremities of the winding 31 is connected to an extremity of the inductive resistor 33 and to an extremity of the capacitor 32. The other extremity of the winding 31 is connected (except in the case of the electric circuit associated with one of the terminals 110, referenced terminal 110a) to the extremity of the inductive resistor 33 of the electric circuit associated with the neighboring terminal 110.

The other extremity of each of the capacitors 31 is connected to a common connector A.

The other extremity of the winding 31 associated with the terminal 110a is connected to a connector B, while the other extremity of the inductive resistor 33 associated with the neighboring terminal to the terminal 110a, referenced terminal 110b, is connected via a resistor to the connector A.

In the embodiment of the invention considered with reference to FIG. 5, the inducing block 30 furthermore includes a piezoelectric module 35 and a switching stage 34.

The piezoelectric module 35 includes a piezoelectric plate 37 arranged in parallel with a capacitor 38. One of their common extremities is connected to the connector A, and the other of their common extremities is connected to the connector B.

The extremity of the piezoelectric plate 37 connected to the connector A is furthermore connected to an extremity of an inductive resistor 43. The other extremity of the inductive resistor 43 is connected to an extremity of a voltage rectifier 42. The other extremity of the rectifier 42 is connected to an extremity of the switch 44 of the switching stage 34. The other extremity of the switch 44 is connected to that of the extremities of the piezoelectric plate 37 connected to the connector B.

In the switching stage, a comparator 39 controls the closing or opening of the switch 44 according to the data supplied to it.

The piezoelectric plate 37 is designed to convert ambient vibrations to electrical energy. This electrical energy, which can be weak, and which depends on the piezoelectric plate 37, is stored in the capacitor 38, which acts as an energy reservoir and thus allows a more stable voltage u to be delivered to the inducing electric circuits associated with the terminals 110.

In order to increase the energy value delivered by the inducing block 30, the voltage u between the connectors A, B of the piezoelectric plate 37 is applied at the inductive resistor 42. This voltage is applied at the inductive resistor 42 when the switch 44 is closed and is not applied at the inductive resistor 42 when the switch 44 is open. The comparator 39 compares the voltage between the connectors A, B of the piezoelectric plate with a fixed minimum threshold and if this voltage is maximum, i.e. higher than the fixed minimum threshold, the comparator 39 controls the closing of the switch 44.

The inductive resistor 43 brakes the drop of the voltage u and thereby enables the capacitor 38 to be charged rapidly according to the principles of exchanges of energy within an oscillating circuit associating an inductive resistor and a capacitor. The voltage rectifier 42 at the output of the inductive resistor 43 enables the charging speed of the capacitor 38 to be improved.

The electrical energy generated by the piezoelectric plate because of the ambient vibrations received by the plate is thus supplied to the electric circuits associated with the terminals 110, which generate an inducing electromagnetic flux. The capacitors 32 associated with the windings 31 enable an appreciably continuous induction to be generated.

When the shaft integral with the outer ring 11 rotates, an induced current is generated through the electric circuits associated with the terminals 120 of the inner ring 12 due to the variation of the inducing electromagnetic flux. The resulting induced voltage V in the electric power supply module 25 is then provided, in the case under consideration, to supply the processing module 20.

With a piezoelectric plate having a power density of 1 mW*cm-3/g, the voltage u has an appreciably sinusoidal shape, of amplitude u0, equal for example to 15 mV.

The value of the induced voltage V is of amplitude V0, equal for example to 25 mV, which corresponds to a voltage gain of approximately 40% between the inducing voltage and the induced voltage.

Such an inducing circuit enables the inducing voltage to be smoothed to a quasi-sinusoidal voltage when the profile of the vibrations varies.

Such a bearing is therefore supplied in an autonomous and integrated manner. Furthermore, the combined functioning of the inducing block 30 and the electric power supply module 25 does not give rise to magnetization when the bearing is idle: the metal particles are not therefore trapped in the bearing in a durable manner, which increases its service life.

In another embodiment, the piezoelectric plate 37 is replaced by a thermoelectric cell, to have the Seebeck effect (also called a Peltier effect cell), which enables an electrical energy to be generated in the case where the bearing is situated inside a heat flow.

In such a case, it is no longer the vibrations, but a temperature difference between two junctions of the thermoelectric cell, which will provide a voltage used to generate the inducing electromagnetic flux.

In an embodiment, the sensor 23 is a sensor designed to measure at least one parameter representative of the vibrations on an axis (for example, the axis radial to the bearing rings) or on two axes or three axes. Such a sensor includes for example an accelerometer or several accelerometers.

In an embodiment, the sensor 23 is designed to deliver to the microprocessor 21 a signal, for example analogue, indicating the successive measurements of the parameter taken by the sensor 23.

Figure 4:
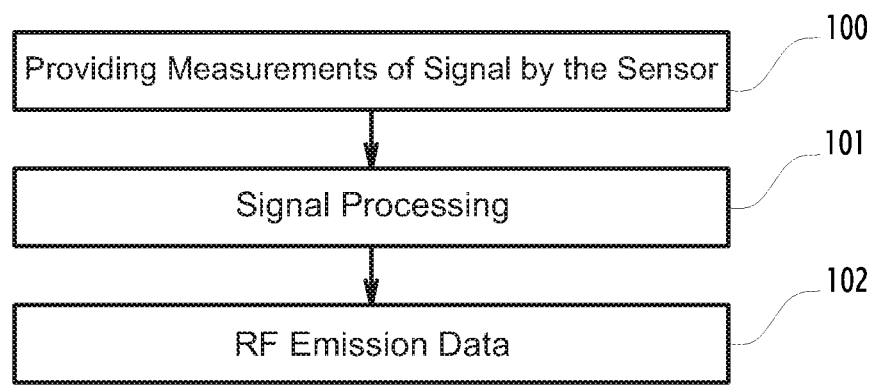
FIG. 4 is a flow chart of steps implemented by the processing module of FIG. 3 in an embodiment of the invention.

Further to the execution in the microprocessor 21 of software instructions of a program stored in the memory 22, the following steps are implemented, with reference to FIG. 4:

In a step 100, the signal indicating the successive measurements taken by the sensor 23 is delivered to the microprocessor 21.

In a step 101, the signal provided by the sensor is processed: it is, for example, sampled and converted to digital data representing the successive values of the parameter measured, and which are stored in the memory 22.

Additional processing is optionally performed based on these successive temporal digital data: averaging, detection of malfunctions, etc.

In a step 102, in an optional embodiment, information derived from digital data, processed if need be, is supplied to the radio frequency transmitter 24, which is designed to transmit it on a radio frequency channel to a monitoring module 7.

The transmission modalities are as follows, for example: transmission every interval of a fixed duration T or transmission each time data of a fixed volume V are available.

In an embodiment, the set of sensors 23 incorporates for example a sensor designed to measure the temperature and/or the angular position of one ring in relation to the other ring, etc.

In an embodiment of the invention, the gearbox 1 furthermore incorporates the monitoring module 7 fastened to the outside of the housing 6.

The monitoring module 7 includes a radio frequency receiver capable of receiving radio frequency data transmitted by each of the bearings 2, similar to the bearing 10 described above.

The monitoring module 7 furthermore includes a memory and is designed to memorize these radio frequency data, matching an identifier of the bearing from which the data were transmitted, and optionally matching dating data representative for example of the moment the data were received by the monitoring module.

In an embodiment, the monitoring module 7 is designed to perform processing of these data. For example, the monitoring module 7 performs averaging of data transmitted by a bearing and/or is designed to combine data transmitted by different bearings, for the purpose of identifying or characterizing malfunctions on the basis of these combined data.

It was considered above that the processing module 20 incorporated, in the case under consideration, the following modules, additional to the electric power supply module 25: a microprocessor 21, a memory 22, a sensor 23 designed to measure one or more parameter(s) and a radio frequency transmitter 24; in other embodiments, these modules are replaced and/or enhanced by other modules, some of which are supplied for example by the electric power supply module 25 according to the invention.

The invention claimed is:

1. A bearing comprising:
   at least one inner ring;
   an outer ring; and
   rolling bodies arranged between the inner and outer rings, one of the inner or outer rings being is designed to rotate while the other stays fixed,
   wherein one of the inner ring or the outer ring includes an inducing element designed to generate an inducing electromagnetic field, the other one of the inner ring or the outer ring includes an electrical circuit that generates an induced current when one of the rings turns in relation to the other, the inducing element generates an inducing electromagnetic field,
   wherein the inducing element designed to generate an inducing electromagnetic field includes a module having at least one of a piezoelectric effect and a module having a thermoelectric effect.

2. The bearing according to claim 1, further comprising a processing module that requires an electric power supply in order to function,
wherein the current induced in the electric circuit is used to supply the processing module.

3. The bearing according to claim 1, wherein at least one part requiring an electric power supply in order to function is integral with the at least one inner ring.

4. The bearing according to claim 1, further comprising a capacitor positioned in parallel with the module having the at least one of the piezoelectric effect and the module having the thermoelectric effect.

5. The bearing according to claim 1, further comprising an inductive resistor on an electric link positioned in parallel with the module having the at least one of the piezoelectric effect and the module having a thermoelectric effect;
a switch designed to one of (a) open the electric link or (b) close the electric link; and
a control device of the switch designed to control the one of the opening of the switch or the closing of the switch according to a voltage value at the terminals of the module having the at least one of the piezoelectric effect and the module having the thermoelectric effect.

6. The bearing according to claim 5, further comprising a voltage rectifier arranged on the electric link.

7. The bearing according to claim 1, the one of the inner ring or the outer ring that includes the inducing element further comprising terminals arranged on a surface thereof, the terminals being configured to project towards the other of the inner ring or the outer ring, and the inducing element having first windings wound around the terminals and electrically connected to the module having the at least one of the piezoelectric effect and the module having the thermoelectric effect.

8. The bearing according to claim 7, wherein a connection of the module having the at least one of the piezoelectric effect and the module having the thermoelectric effect is connected to one extremity of each of the first windings via respective capacitors.

9. The bearing according to claim 7, wherein the other extremity of each of the first windings is connected to one of:
a) an extremity of the first winding arranged on a neighboring terminal via an inductive resistor, or
b) another connection of the module having the at least one of the piezoelectric effect and the module having the thermoelectric effect.

10. The bearing according to claim 1, the one of the inner ring or the outer ring including the electric circuit further includes terminals arranged on a surface thereof, the terminal being configured to project towards the other of the inner ring or the outer ring; and
the electric circuit further includes second windings wound around the terminals.

11. The bearing according to claim 10, each second winding further comprising a first extremity and a second extremity, wherein the first extremity and the second extremity of each second winding are connected to a common terminal.

12. The bearing according to claim 11, wherein the first extremity of each second winding is connected to the common terminal via a resistor.

13. The bearing according to claim 12, wherein the second extremity of each second winding is connected to the common terminal via an inductive resistor.

* * * * *